(12) United States Patent
Greene

(10) Patent No.: US 11,509,858 B2
(45) Date of Patent: Nov. 22, 2022

(54) AUTOMATIC PROGRAM FORMATTING FOR TV DISPLAYS

(71) Applicant: DISH Technologies L.L.C., Englewood, CO (US)

(72) Inventor: Gregory Greene, Littleton, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 16/917,599

(22) Filed: Jun. 30, 2020

(65) Prior Publication Data

US 2020/0336700 A1 Oct. 22, 2020

Related U.S. Application Data

(62) Division of application No. 15/839,340, filed on Dec. 12, 2017, now Pat. No. 10,742,925, which is a division of application No. 14/631,531, filed on Feb. 25, 2015, now Pat. No. 9,866,789.

(51) Int. Cl.
| | |
|---|---|
| *H04N 7/01* | (2006.01) |
| *H04N 5/46* | (2006.01) |
| *H04N 21/4402* | (2011.01) |
| *H04N 21/258* | (2011.01) |
| *H04N 21/475* | (2011.01) |

(52) U.S. Cl.
CPC .............. *H04N 7/0122* (2013.01); *H04N 5/46* (2013.01); *H04N 21/25825* (2013.01); *H04N 21/440272* (2013.01); *H04N 21/4755* (2013.01)

(58) Field of Classification Search
CPC ........... H04N 7/0122; H04N 21/25825; H04N 21/4755; H04N 5/46; H04N 21/440272
See application file for complete search history.

(56) References Cited

U.S. PATENT DOCUMENTS

| | | | |
|---|---|---|---|
| 2002/0180887 A1* | 12/2002 | Kim ...................... | H04N 7/0122 348/556 |
| 2008/0007651 A1* | 1/2008 | Bennett .................. | H04N 7/162 348/443 |
| 2009/0112980 A1* | 4/2009 | Fujimoto ........... | H04N 21/2662 709/203 |
| 2009/0177996 A1* | 7/2009 | Hunt ...................... | G09G 5/003 715/788 |

(Continued)

*Primary Examiner* — Michael Lee
(74) *Attorney, Agent, or Firm* — Jeremiah J. Baunach; VLP Law Group LLP

(57) ABSTRACT

A smart multimedia content receiver automatically resizes video images based on the content being displayed on the TV screen. Such a self-formatting content receiver includes on-board image processing capability that provides continuous video analysis to detect changes in program formatting and convert each frame as it is received in real time, as opposed to processing and re-releasing an entire program or movie, or relying on the viewer to re-format programs manually. In response to detecting a change, aspect ratio adjustments are made as needed. Because the self-formatting content receiver has access to the video data before it is displayed, such automatic on-the-fly adjustments ensure that the viewer's experience during program changes is seamless and without distortion. Subscribers can influence decisions made by the content receiver by pre-setting viewer preferences for aspect ratio adjustment.

12 Claims, 7 Drawing Sheets

(56) References Cited

U.S. PATENT DOCUMENTS

| | | | |
|---|---|---|---|
| 2009/0251594 A1 | 10/2009 | Hua et al. | |
| 2010/0031139 A1* | 2/2010 | Ihara | G06F 16/9577 |
| | | | 715/234 |
| 2010/0194753 A1* | 8/2010 | Robotham | G06F 16/9577 |
| | | | 345/428 |
| 2013/0147845 A1* | 6/2013 | Xie | H04L 67/2823 |
| | | | 345/660 |
| 2015/0128030 A1* | 5/2015 | Tyagi | G06F 16/9577 |
| | | | 715/238 |
| 2016/0203585 A1* | 7/2016 | Welinder | G06K 9/6215 |
| | | | 382/195 |
| 2016/0231978 A1* | 8/2016 | Hawver | A63F 13/42 |
| 2016/0234522 A1 | 8/2016 | Lu et al. | |
| 2016/0316243 A1* | 10/2016 | Park | H04N 21/2343 |

\* cited by examiner

AUTOMATIC PROGRAM FORMATTING FOR TV DISPLAYS

BACKGROUND

Technical Field

The present disclosure generally relates to TV displays, and in particular, to automatically formatting media content for display on a TV screen.

Description of the Related Art

Movies and television programming use various image size formats for projecting images onto movie screens or television displays. Formats that have been used historically originated in the film industry and were based on the size of individual frames used in motion picture film, e.g., 28 mm, 35 mm, and so on. The high-definition format currently in use for broadcast television in the U.S. (HDTV) has an aspect ratio of 16:9, meaning the picture is rectangular, having dimensions of 16 units wide and 9 units high. The 16:9 aspect ratio is equivalently expressed as the normalized ratio 1.77:1. Other aspect ratios commonly used for video include widescreen TV format having an aspect ratio of 4:3, equivalent to 1.33:1, various intermediate aspect ratios between 1.33:1 and 1.77:1, 1.85:1, and 2.4:1. Older TV shows that were originally filmed for widescreen TV, and older movies, can be re-mastered by a production studio to convert the format to the 1.77:1 format.

With the recent advent of many types of displays, the video content may not have a standard aspect ratio of a type commonly used. For example, videos are being recorded on many different brands of cell phones, video cameras, and various portable electronic devices. With the wide availability of many types of video recording devices and video cameras, the aspect ratio of a particular recorded video cannot be easily determined in advanced, and may vary over a wide range. In addition, a large number of different displays are now available. Displays can be as small as a watch or a cell phone, and as large as the size of a wall. Further, the aspect ratio of a particular display may not fit any standard, and may vary widely from one display to another.

The term high definition (HD), as it is used today, refers to a high density video image having a resolution of at least 1280×720 pixels, projected onto a display at a frame rate of 60 frames/sec, or 60 Hz. More specifically, HD video has 720 horizontal lines and 1280 vertical columns, wherein 1280/720=16:9=1.77. While a standard SD-DVD disc stores up to 4.5 GB of standard resolution video image data, a typical HD-DVD video disc stores up to 15 GB of HD video image data.

TV displays typically allow viewers to configure the screen differently as needed for different resolution programs having different aspect ratios. Depending on the screen size and the format of the program, the video images may fill the entire screen, or there may be black vertical or horizontal sidebars at the edges of the screen, filling in the unused portion, or a portion of the image may bleed off the screen and not be visible. The viewer may have to decide whether to make the image size smaller than the screen and tolerate the sidebars, or lose some of the picture because it is too big to fit on the screen. Once the viewer adjusts the screen according to the desired format for the current program, if the viewer switches channels or if a commercial comes on, the adjustment made for the initial program may not be suitable for the new video images. For example, commercials may be distorted or a new show may be partially off the screen, thus requiring the viewer to manually re-adjust the format settings every time they switch from one program to another. Such constant re-adjustment is a nuisance for the viewer.

In the case of commercials in particular, it is unlikely that a viewer will bother to manually adjust the format settings for each new commercial that is broadcast. As a result, commercial advertising messages may be lost on the audience because viewers are distracted by distorted commercial images. Alternatively, a portion of the commercial message that exceeds the size of the screen may not be visible, which could impair its effectiveness in marketing to the viewer.

BRIEF SUMMARY

Due to a high level of competition among entertainment content providers, those who are able to eliminate video formatting problems may gain a business advantage when competing for subscribers and advertisers. Such an advantage may be attained through the use of a smart content receiver, or smart set top box (STB), that automatically resizes video images based on the content being displayed on the TV screen. Such a self-formatting STB includes on-board image processing capability that provides continuous video analysis to detect changes in program formatting and convert each frame as it is received in real time, as opposed to processing and re-releasing an entire program or movie, or relying on the viewer to re-format programs manually. In response to detecting a change, the self-formatting STB makes aspect ratio adjustments as needed. Because the self-formatting STB has access to the video data before it is displayed, such automatic on-the-fly adjustments ensure that the viewer's experience during program changes is seamless and without distortion. Subscribers can influence decisions made by the STB by pre-setting viewer preferences for aspect ratio adjustment.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

Figure 1:
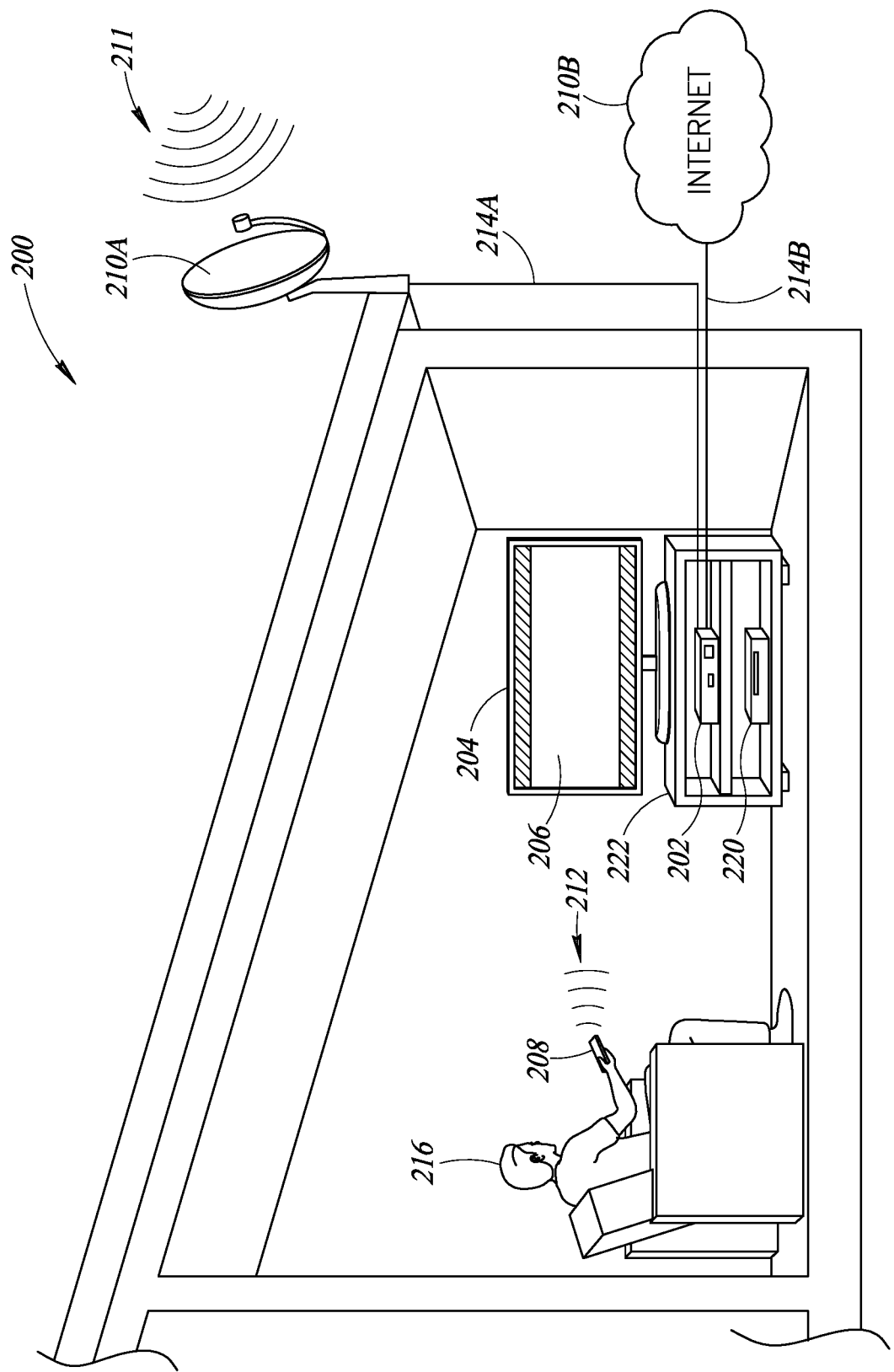
FIG. 1 is a schematic illustration of an exemplary residential media entertainment system that provides automatic program formatting, according to one embodiment described herein.

In the following description, certain specific details are set forth in order to provide a thorough understanding of various aspects of the disclosed subject matter. However, the disclosed subject matter may be practiced without these specific details. In some instances, well-known structures and methods of video display, comprising embodiments of the subject matter disclosed herein, have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

In this specification, embodiments of the present disclosure illustrate a subscriber satellite television service as an example. This detailed description is not meant to limit the disclosure to any specific embodiment. The present disclosure is equally applicable to cable television systems, broadcast television systems, Internet streaming media systems, or other television or video distribution systems that include user hardware, typically in the form of a content receiver or set top box that is supported by the media provider or by a third party maintenance service provider. Such hardware can also include, for example, digital video recorder (DVR) devices and/or digital-video-disc (DVD) recording devices or other accessory devices inside, or separate from, the set top box.

Throughout the specification, the term "subscriber" refers to an end user who is a customer of a media service provider and who has an account associated with the media service provider. Subscriber equipment resides at the subscriber's address. The terms "user" and "viewer" refer to anyone using part or all of the home entertainment system components described herein.

The disclosure uses the term "signal" in various places. One skilled in the art will recognize that the signal can be any digital or analog signal. Those signals can include, but are not limited to, a bit, a specified set of bits, an A/C signal, or a D/C signal. Uses of the term "signal" in the description can include any of these different interpretations. It will also be understood by one skilled in the art that the term "connected" is not limited to a physical connection but can refer to any means of communicatively or operatively coupling two devices.

As a general matter, the disclosure uses the terms "television converter," "receiver," "set top box," "television receiving device," "television receiver," "television recording device," "satellite set top box," "satellite receiver," "cable set top box," "cable receiver," and "content receiver," to refer interchangeably to a converter device or electronic equipment that has the capacity to acquire, process and distribute one or more television signals transmitted by broadcast, cable, telephone or satellite distributors. DVR and "personal video recorder (PVR)" refer interchangeably to devices that can record and play back television signals and that can implement playback functions including, but not limited to, play, fast-forward, rewind, and pause. As set forth in this specification and the figures pertaining thereto, DVR and PVR functionality or devices can be combined with a television converter. The signals transmitted by these broadcast, cable, telephone, satellite, or other distributors can include, individually or in any combination, Internet, radio, television or telephonic data, and streaming media. One skilled in the art will recognize that a television converter device can be implemented, for example, as an external self-enclosed unit, a plurality of external self-enclosed units or as an internal unit housed within a television. One skilled in the art will further recognize that the present disclosure can apply to analog or digital satellite set top boxes.

As yet another general matter, it will be understood by one skilled in the art that the term "television" refers to a television set or video display that can contain an integrated television converter device, for example, an internal cable-ready television tuner housed inside a television or, alternatively, that is connected to an external television converter device such as an external set top box connected via cabling to a television. A further example of an external television converter device is the EchoStar Hopper combination satellite set top box and DVR.

A display may include, but is not limited to: a television display, a monitor display, an interlaced video display, a non-interlaced video display, phase alternate line (PAL) display, National Television System Committee (NTSC) systems display, a progressive scan display, a plasma display, a liquid crystal display (LCD) display, a cathode ray tube (CRT) display and various High Definition (HD) displays, an IMAX™ screen, a movie screen, a projector screen, etc.

Specific embodiments are described herein with reference to entertainment systems having automatic features that have been produced; however, the present disclosure and the reference to certain materials, dimensions, and the details and ordering of processing steps are exemplary and should not be limited to those shown.

Turning now to the drawings, FIG. 1 shows a home entertainment system 200 that features automatic program formatting. The entertainment system 200 includes a content receiver 202, a media presentation device 204 having a display 206, and a remote control 208. The content receiver 202, e.g., a television set top box (STB), can also be coupled to the media presentation device 204, or the content receiver 202 can be in the form of hardware built into the media presentation device 204. Instructions that carry out features of the entertainment system 200 are stored in, and/or executed by, components of the content receiver 202.

The content receiver 202 is communicatively coupled to one or more sources of media content 210 (two shown, 210A and 210B) to receive the media content for presentation via the media presentation device 204. Sources of media content 210 can include one or more of a terrestrial television or radio antenna, a satellite receiving antenna 210A, a broadband cable subscriber service, streaming media received from the Internet 210B directly or via a wireless Internet router, and the like. Media content is provided as a media signal, via communication links 214, e.g., a satellite antenna communication link 214A, or an Internet communication link 214B. The communication links 214 can accommodate a wired signal or a wireless signal. Furthermore, a content provider may provide to a viewer 216 multiple media signals, e.g., via satellite and/or via the Internet as shown, via broadband cable and/or Internet, or in any other suitable way.

The content receiver 202 may be communicatively coupled to one or more peripheral devices 220 such as a media playback device including, but not limited to, a DVD player, a VCR, a stereo, a television, a game console, or a stand-alone DVR device that provides an alternate source of content directly to the display 206 via a wireless or a wired connection 222. Any of the peripheral devices 220 can be subscriber-owned devices, or they can be supplied by a media subscription service.

The satellite receiving antenna 210A receives media content via a satellite signal 211 from one or more satellite transponders in earth orbit. Each satellite transponder is, for purposes of the entertainment system 200, a source of content that transmits one or more media channels, such as HBO, ESPN, pay-per-view channels, etc., to the satellite receiving antenna 210A. A satellite television distributor can transmit one or more satellite television signals to one or more satellites. Satellite television distributors can utilize several satellites to relay the satellite television signals to subscribers. Each satellite can have several transponders. Transponders transmit the satellite signal from the satellite to the satellite receiving antenna 210A.

The media presentation device 204 having the display 206 can be any electronic device that presents media content to a user; for example, a television, a radio, a computer, a mobile computing device such as a laptop, a tablet, a gaming console, a smart phone, or the like, or the display 206 itself. The display 206 can be any kind of video display device, such as a cathode ray tube display, a liquid crystal display (LCD), a plasma display, a television, a computer monitor, a rear projection screen, a front projection screen, a heads-up display, or any other electronic display device. The display 206 can be separate from, or integrated into, the media presentation device 204. The display 206 can include audio speakers, or the display 206 can be coupled to separate audio speakers. The term "for display" as used herein generally includes presentation of an audio component as well as a video component of the media signal.

The remote control 208 is configured to communicate with the content receiver 202 via a wireless connection path 212, for example, an infrared (IR) signal. The remote control 208 can be operated by the viewer 216 to cause the content receiver 202 to display received content on the media presentation device 204. The remote control 208 may also be used to display a programming guide on the display 206 and to communicate program selections to the content receiver 202. The remote control 208 can also be used to send commands to the content receiver 202, including channel selections, display settings, format selections, and the like. The wireless connection path 212 can use, for example, infrared or UHF transmitters within the remote control 208. One example of an embodiment of the remote control 208 is the EchoStar Technologies Corporation 40.0 Remote Control that includes an IR transmitter and an ultra-high frequency (UHF) transmitter. The remote control 208 may be able to send signals to other peripheral devices that form part of the entertainment system 200. The content receiver 202 may also be able to send signals to the remote control 208, including, but not limited to, signals to configure the remote control 208 to operate other peripheral devices in the entertainment system 200. In some embodiments, the remote control 208 has a set of Light Emitting Diodes (LEDs). Some remote controls can include Liquid Crystal Displays (LCDs) or other display screens. The remote control 208 can include buttons, dials, or other man-machine interfaces. While the remote control 208 is often the means for a user to communicate with the content receiver 202, one skilled in the art will recognize that other means of communicating with the content receiver 202 are available, including, but not limited to attached keyboards, smart phones, front panel buttons or touch screens.

Figure 2:
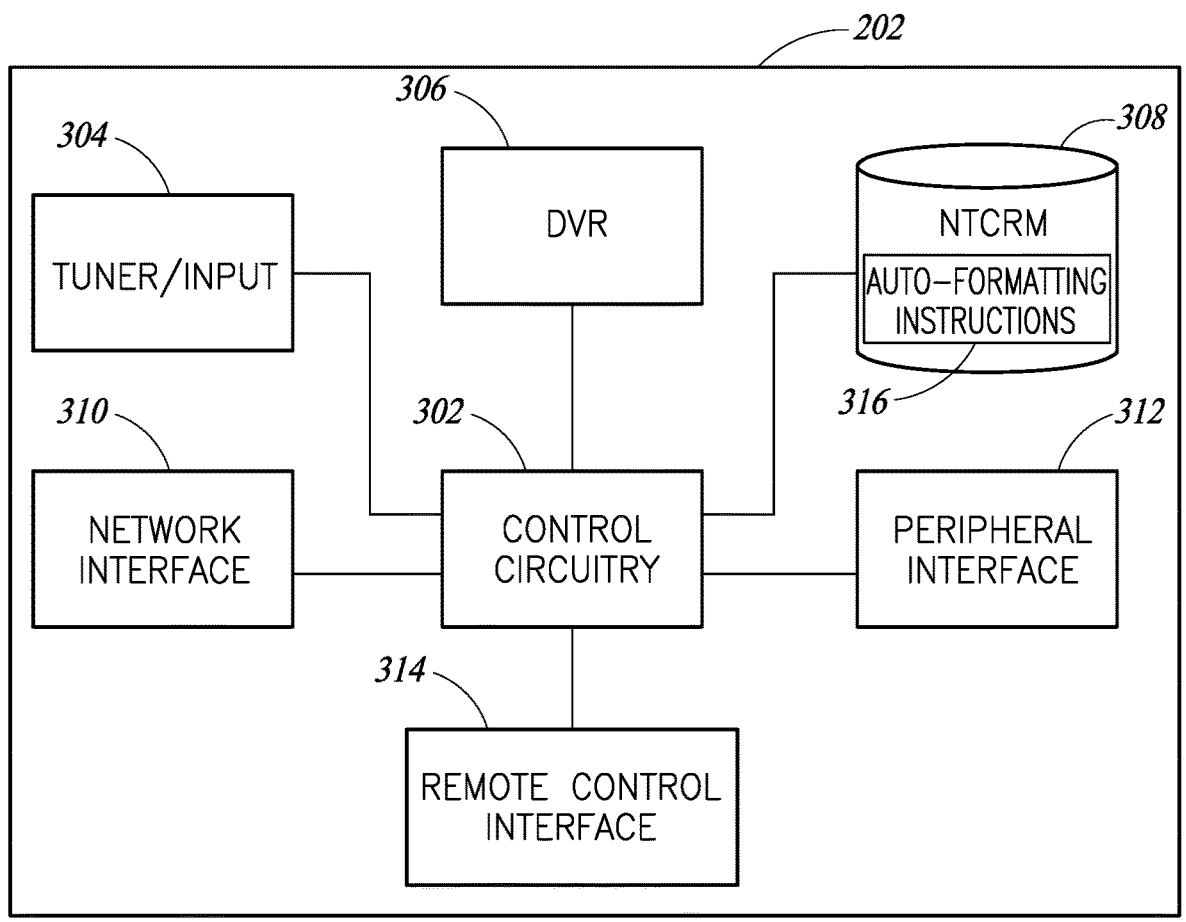
FIG. 2 is a block diagram showing components of a content receiver that includes an automatic program formatting feature, according to an embodiment described herein.

FIG. 2 shows components of the content receiver 202, according to one embodiment described herein. The content receiver 202 is a set top box equipped with instructions that carry out an embodiment of the present disclosure. Components of the content receiver 202 include control circuitry 302, one or more tuners 304 (two shown, 304a, 304b), an optional internal digital video recorder (DVR) 306, a non-transitory computer readable memory (NTCRM) 308, a network interface 310, a peripheral interface 312, and a remote control interface 314. A set of automatic program formatting instructions 316 may reside in the memory 308 for execution by one or more microprocessors within the control circuitry 302, e.g., by a general purpose central processing unit (CPU), or a specialized image processing unit (IPU).

Generally, the content receiver 202 can receive one or more television signals from a media provider such as a cable television distributor, a broadcast television distributor, the Internet, or a satellite television distributor. In addition, in the embodiment shown, the entertainment system 200 receives electronic program guide (EPG) information from a satellite television distributor via the content receiver 202. One skilled in the art will recognize that the content receiver 202 can also receive video-digital subscriber line (DSL), DSL, Internet, wireless and other signals from content or video distributors. The content receiver 202 can process television signals and can send the processed signals to peripheral electronic devices, such as the display 206 and the remote control 208. The content receiver 202 also can accept commands from the remote control 208 or other peripheral electronic devices. One skilled in the art will recognize that many embodiments of the entertainment system 200 are possible and within the scope of this disclosure. Other such embodiments can include, but are not limited to, various combinations or permutations of devices and connections for the delivery, storage, and display of communications, content and other data.

In one embodiment, the content receiver 202 receives media content from the satellite receiving antenna 210A. Each tuner 304 tunes into a selected media channel received by the satellite receiving antenna 210A to acquire the satellite signal 211. Tuners 304 initially process the satellite signal. When the content receiver 202 includes multiple tuners 304, the content receiver 202 can record two or more programs that air simultaneously. Generally, the content receiver 202 can record one show at a single time for each tuner 304 that the content receiver 202 includes. For example, if the content receiver 202 includes two tuners, then the content receiver 202 can record and/or view two media programs simultaneously. Thus if there is a recording conflict between two programs, the content receiver 202 can still record both programs because it has two tuners. If a recording conflict occurs because the number of tuners 304 is less than the number of programs that the user wants to view or record, the control circuitry 302 can be programmed to resolve the conflict by prioritizing certain media content according to the subscriber's directions, or automatically, based on various criteria.

Each tuner 304 transmits an acquired satellite signal to the control circuitry 302 where the signal can undergo more extensive signal processing. The control circuitry 302 can include a content receiver decoder, such as, for example, the STi5517 Low-Cost Interactive Set top box Decoder, Part No. 7424736A, available from STMicroelectronics, Inc. Signals from the control circuitry 302 can include, but are not limited to, a signal to tune to a transponder as part of the process of selecting a certain channel for viewing on a peripheral device. A first step in signal processing by the control circuitry 302 can include, for example, demodulating the satellite signal. Further signal processing can include error checking. In one embodiment, the satellite signal 211 is in digital form, for example, a digital stream, after demodulation and error correction. The digital stream may use, for example, the digital video broadcasting (DVB) transport standard. The digital stream may be multiplexed and therefore require de-multiplexing to separate the digital stream into separate digital data streams. Each of the separate digital data streams may also be encoded and/or compressed to provide the system with increased bandwidth. In satellite television, encoding formats may include the MPEG, MPEG2 or MPEG4 standards. One skilled in the art will recognize that systems with analog data or combined analog and digital data are also possible and contemplated herein.

The control circuitry 302 may further include one or more video processing units that, among other video processing operations, may decode the encoded digital television signal. The video processing units may include, for example, a graphics processor, an MPEG-2 decoder, and a display compositor with separate on-screen display (OSD) control for peripheral devices. The control circuitry 302 may further include a video encoder that encodes a digital stream for output to one or more peripheral devices, including, but not limited to, a television. Encoding may allow program data to be compressed. The control circuitry 302 may also include a storage device interface that couples the control circuitry 302 to storage devices such as the DVR 306 and the memory 308. An audio processing unit may also be part of the control circuitry 302. The audio processing unit may, for example, decode the digital stream for output to peripheral devices, including, but not limited to, a stereo, television speakers or portable audio or video players. The audio processing unit may include one or more processors, memory components or digital to audio converter (DAC) systems.

The control circuitry 302 includes one or more processors such as a general purpose central processing unit (CPU). The CPU may execute logical operations to execute functions of the content receiver 202 including, but not limited to, channel selection, system maintenance, recording control, EPG display and control, and functions of the entertainment system 200. Examples of commercially available CPUs include the STMicroelectronics Enhanced ST20 32-bit VL-RISC, or Intel Xeon or Atom series processors that are designed or adapted for servers. One skilled in the art will recognize that the CPU may be integrated with memory or other discrete electronic components. The control circuitry 302 may further include a custom application-specific integrated circuit (ASIC) chip, such as from the LSI Logic G11 family, or FPGA, such as from the Altera Stratix™ family. Alternatively, a microcontroller can be substituted for the CPU. Microcontrollers generally include, in addition to a CPU, extra program memory such as read-only memory (ROM), and input/output (I/O) functionality. The control circuitry 302 may further include one or more memory components that may be used for many purposes, including, but not limited to, storing EPG data and storing data for use by the CPU. Memory components may include volatile memory such as SDRAM memory chips and non-volatile memory devices such as ROM, SRAM, SDRAM and Flash ROM. One skilled in the art will recognize that volatile memory and non-volatile memory may be integrated within other electronic components and that other memory components may be included within content receiver 202 and control circuitry 302.

The DVR 306 may be used for many purposes, including, but not limited to, storing recorded programs and buffering currently playing programs to pause or rewind a program. The DVR 306 can be used to record programs locally in the content receiver 202 so that the user may view the TV show at a later, more convenient time. When the user selects a program to be recorded to the DVR 306, the content receiver 202 sets a recording timer that causes the content receiver 202 to automatically record the selected program at the scheduled time. At a time convenient to the user, the user can operate the remote control 208 to cause the content receiver 202 to display a list of programs that have been recorded to the DVR 306. The user can select the desired program from the list of recorded programs and the content receiver 202 will play back the selected program.

Alternatively, the content receiver 202 may access, via the Internet 210B, recorded programs stored on a remote storage device. In this case, when the user of the content receiver 202 selects a media program to be recorded, the media program is recorded to remote storage instead of to the DVR 306 inside the content receiver 202. The user of the content receiver 202 can schedule media program recordings by accessing the Internet 210B through a smart phone, a PC, a tablet, a laptop, or other suitable means. The user can log into an account associated with the content receiver 202 and can schedule recordings via the Internet 2106. The media programs can be viewed by connecting the content receiver 202 to the Internet 2106 to access the remote storage device.

The content receiver 202 can store in the memory 308 instructions that implement automatic program formatting as described herein. Automatic program formatting can be offered to subscribers as an optional feature of the entertainment system 200, in which case, when a subscriber orders the entertainment system 200, an associated automatic program formatting code 316 containing instructions is downloaded to the memory 308 for execution by the control circuitry 302 within the content receiver 202. If needed, the automatic program formatting code 316 can store video image data in memory that resides in a portion of the DVR 306. The DVR 306, equipped with high-density memory, is capable of storing large amounts of data, and is therefore appropriate for storing video image data for use by the entertainment system 200.

The content receiver 202 can be connected to the display 206 through a peripheral interface 312 to send and receive signals to and from the display 206. For instance, a television can receive video and audio signals, whereas a stereo can receive only audio signals. A camcorder, on the other hand, can send video or audio signals to the satellite content receiver 202 or receive audio and video signals from the content receiver 202 to record. As another example, the peripheral interface 312 can include a processor or other electronic components to permit an interface to content security devices such as an external smart card. The peripheral interface 312 can then encrypt or decrypt content for output to other peripheral devices. Thus, the peripheral interface 312 can perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices can include many types of commercially available electronic devices, e.g., a phone line and a modem.

The network interface 310 provides network connectivity, for example, to the Internet 210B via a wireless router or a local area network. The peripheral interface 312 can include components that permit connection of RJ-45 network cabling and transmission of TCP/IP traffic to other connected devices. As another example, a wireless router can be attached via the peripheral interface 312 to allow wireless local-area-network (WLAN) data communications using a standard wireless networking protocol such as WiMAX, 802.11b or 802.11g. One skilled in the art will recognize that various other network connections to the content receiver 202 are possible.

The remote control interface 314 includes instructions that allow the viewer 216 to communicate with the satellite content receiver 202, and can be implemented using the peripheral interface 312 or by connecting a separate remote control interface device. The remote control interface 314 can translate an input from the user into a format understandable by the control circuitry 302. The remote control interface 314 can thus be considered a user interface (UI). The translation systems can include, but are not limited to, electronic receivers and electronic relays. The remote control interface 314 can receive commands from more than one remote control 208. The remote control 208 can use infrared, UHF, or other communications technology. One skilled in the art will recognize that other means to receive and translate user inputs are possible.

The memory 308 can be used for many purposes, including, but not limited to, storing programming data, storing commands or functions for the control circuitry 302, storing timers or record events, and storing data for other devices within or connected to the satellite content receiver 202. In one embodiment, the memory 308 provides the long-term storage functionality of the content receiver, e.g., for persistent recordings, and may also include operating system software and other data or software necessary to the content receiver, and the DVR 306 provides short-term storage functionality, e.g., for temporary recordings of programs.

The memory 308 can be, for example, an 80 GB Winchester' hard drive connected to the control circuitry 302 via a standard IDE/EIDE interface cable. As another example, the memory 308 may be used to temporarily store data for processing by the CPU or image processor. One skilled in the art will recognize that other storage devices and interfaces may be substituted for those shown and described herein while still remaining within the scope of this disclosure. One skilled in the art will also recognize that the storage device 308 may include a storage device interface and that portions of the storage device 308 may separately or together include an integrated memory, e.g., a memory buffer, commonly referred to as cache, and additional processing components or logic. One skilled in the art will also recognize that a storage device interface may be integrated into the peripheral interface 312. Finally, one skilled in the art will recognize that the memory 308 may be external and connected to the content receiver 202. For example, an external hard drive may be connected to the content receiver 202 using USB 2.0 or IEEE 1394 FireWire connections. Such an external hard drive may include a screen for portable viewing of programming stored on it. Furthermore, such a storage device can contain expansion slots, such as IDE connections, for the provision of additional storage devices to provide additional capacity at a later time. The design and operation of hard drives and similar devices are well known in the art and need not be described further here.

Figure 3:
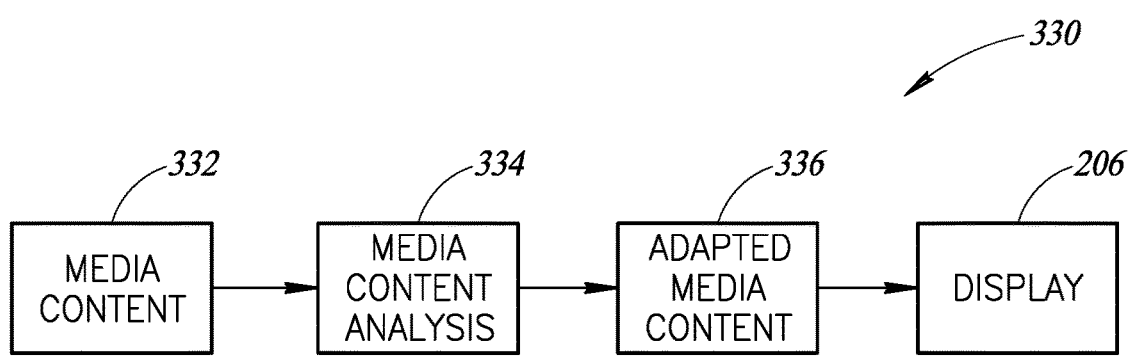
FIG. 3 is a high-level flow diagram summarizing flow of multimedia information in a system that supports automatic program formatting, according to one embodiment described herein.

FIG. 3 shows an overview of information flow 330 through the entertainment system 200 that includes the content receiver 202 featuring the automatic program formatting code 316, according to one embodiment. The information flow 330 starts with original media content 332, which undergoes media content analysis 334, to determine when to produce adapted media content 336. The adapted media content 336 is then displayed on the display 206 for the viewer 216.

In one embodiment, the media content 332 is received by the content receiver 202 from one of a plurality of sources, e.g., from a TV content provider via the satellite dish 210A, for example, through the tuner 304, or from the Internet 210B via the network interface 310, or from storage in the DVR 306. The media content 332 is in the form of multimedia program data that generally includes a sequence of video frames and accompanying audio data and text data. Individual video frames are extracted from the media content 332 and are directed to the control circuitry 302, which performs the media content analysis 334. The control circuitry 302 examines the video frames specifically to determine the aspect ratio of the video data. According to one embodiment, the control circuitry 302 has previously performed a query of the display 206 to determine the preferred aspect ratio for a frame which is shown on the display 206. Accordingly, the aspect ratio of the display 206 is available to the control circuitry 302, and this can be compared to the aspect ratio of the frame of the video data during the step of media content analysis 334. If the aspect ratio of the frame of the media content matches the aspect ratio of the display 206, then no action is taken, and the frame is passed forward to the display 206 via the peripheral interface 312. On the other hand, if the frame of the media content has a different aspect ratio than the video display 206, then the aspect ratio of the frame is modified to match the aspect ratio of the video display 206. This analysis is performed on a particular frame on a frame-by-frame basis of the video as it is received, e.g., from the tuner 304, for outputting to the display 206 via the periphery interface 312. After an initial frame has been analyzed and set to the proper aspect ratio, subsequent steps, need only determine whether or not the aspect ratio of the current frame matches that of the most recent frame. Such an analysis can be performed very quickly with minimal processor overhead.

If the aspect ratio of the present frame matches the aspect ratio of the previous frame in the sequence, no adjustment is needed. If there is a shift in the aspect ratio, the control circuitry 302 adapts the aspect ratio of the current media content 332 to produce the adapted media content 336, in which the program data is changed to have an aspect ratio that matches the aspect ratio of the previously displayed video frame. The program is then displayed with the adjusted aspect ratio so that when the viewer 216 views the current content on the display 206, the sequence of images will be displayed seamlessly, without a loss of continuity.

Alternatively, the media content analysis 334 can be performed remotely instead of being performed locally by the control circuitry 302 on board the content receiver 202. For example, after a video frame is extracted from the media content 332, associated frame data can be sent to a remote server. The remote server can then perform the media content analysis 334 to determine whether or not the aspect ratio needs adjustment. When no adjustment is needed, the server transmits a signal to the content receiver 202 indicating that the original frame is suitable for display on the display 206. When an adjustment is needed, the remote server transmits formatting information to the content receiver 202. The content receiver 202 then generates the adapted media content 336 based on the formatting information received from the remote server, and displays the adapted video frame on the display 206 via the peripheral interface 312.

Figure 4A:
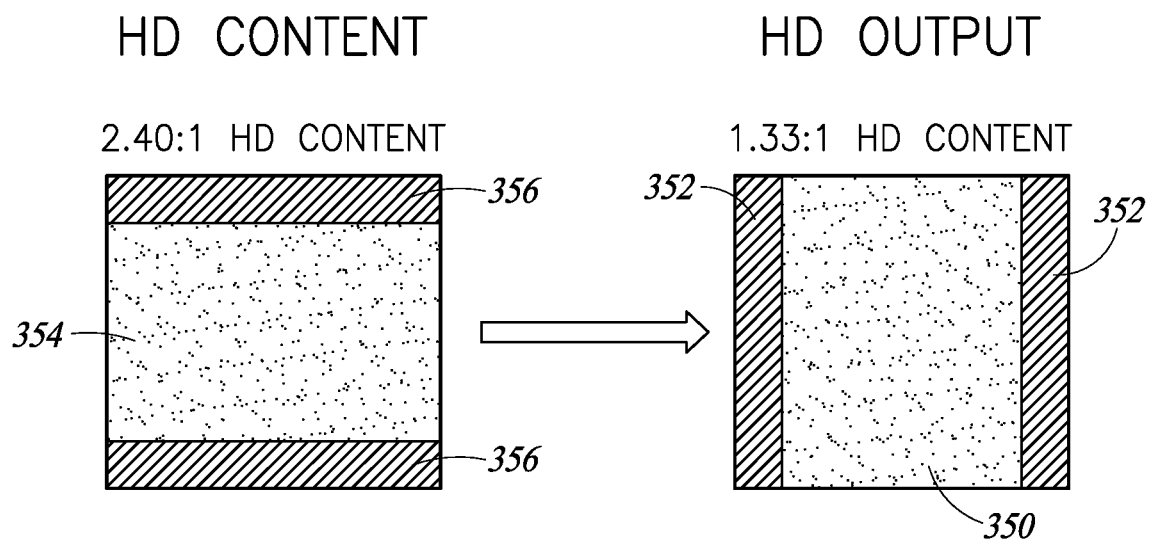
FIGS. 4A and 4B are pictorial views showing exemplary input and output formats that a viewer would see when using an automatic program formatting feature to transform high definition video content as described herein.

With reference to FIG. 4A, for example, media content currently being shown on the display may have an aspect ratio of 1.33:1, which appears as a vertically-oriented picture 350 having left and right vertical sidebars 352. New media content that has been received and is being analyzed by the control circuitry 302 may have an aspect ratio of 2.4:1, which appears as a horizontally-oriented picture 354 having upper and lower horizontal sidebars 356. When the control circuitry 302 detects that the video frames differ, the frame currently under analysis may be modified to have an aspect ratio of 1.33:1, so it will match the frame currently being viewed.

Figure 4B:
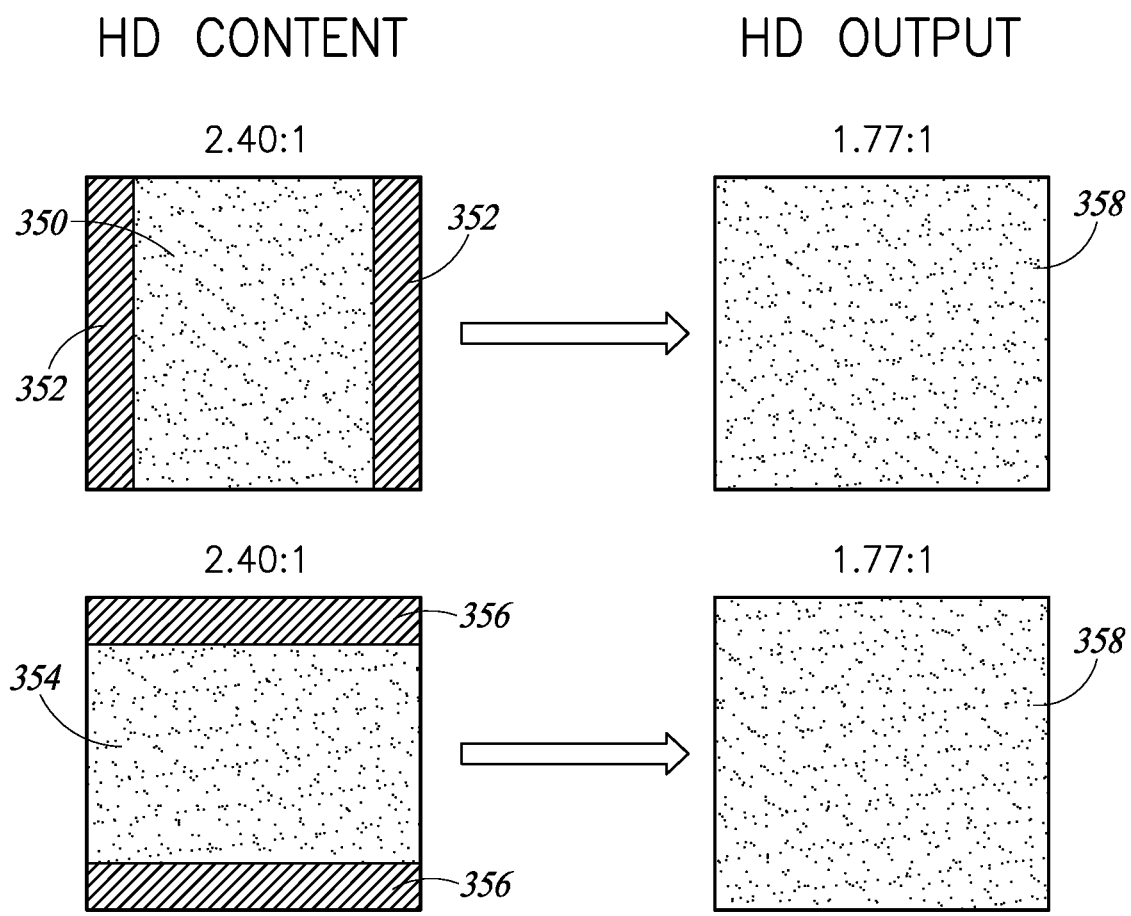

Alternatively, every frame can be compared against an independent standard. For example, all the frames can be modified to have an aspect ratio of 1.77:1, which appears as a picture 358 having no sidebars. This embodiment is illustrated in FIG. 4B. In this case, the comparison made by the control circuitry 302 is of the data under analysis against data residing in the memory 308, as opposed to comparing the next picture against the current picture. In the example shown, the data represents the picture 358 having the aspect ratio of 1.77:1. Such an independent standard may be selected by the viewer from a list of choices, or the independent standard may be stored as a viewer preference in a preferences file in the content receiver 302.

It is noted that the methods described herein change the actual media data to improve the image display, rather than simply changing format settings on the display device in an automated fashion. In one embodiment, in addition to changing the locations of the sidebars, if needed, the picture being shown can also be modified to reduce distortion.

Figure 5:
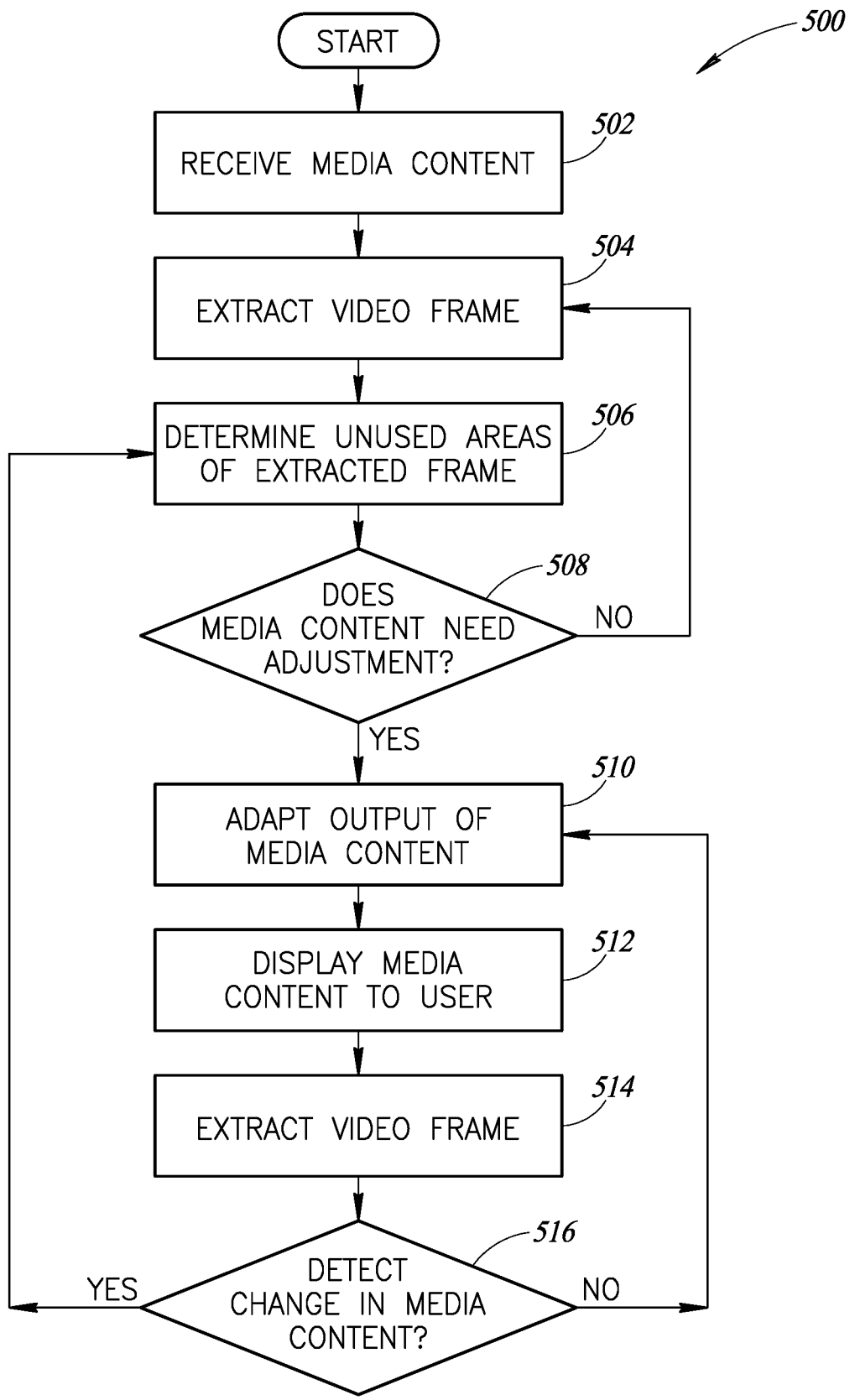
FIG. 5 is a flow diagram showing a sequence of steps in a computer-implemented method of automatic program formatting, according to a first embodiment as described herein.

FIG. 5 is a flow diagram showing a computer-implemented method 500 of automatic program formatting, according to one embodiment. The method 500 is codified as automatic formatting instructions 316 to be executed by a microprocessor, e.g., a specialized image processor, within the control circuitry 302 of the content receiver 202 or a remote microprocessor. Programmed automatic formatting instructions can be stored on board the microprocessor, or in the computer-readable memory 308.

At 502, the content receiver 202 receives the media content 332 in the form of a multi-media stream that includes a video data stream.

At 504, the content receiver 202 extracts a video frame from the video data stream for analysis, prior to displaying the frame.

At 506, the content receiver 202 determines the location and size of unused areas of the extracted frame. For example, the content receiver 202 determines whether or not vertical or horizontal sidebars are present in the image, and if so, how wide the sidebars are. In one embodiment, such a determination can be made by examining the edges of the extracted video frame, starting at the corners, and searching for black regions that indicate sidebars. For example, pixels can be sampled along an edge column to detect a full column of black pixels. Then one pixel at the top of each successive column can be examined until a non-black pixel is found. The column of the last black pixel can then be sampled to confirm the location of the innermost full column of black pixels, and hence to deduce the width of a vertical sidebar. A similar scheme can be carried out for rows to recognize and measure the width of black regions that are consistent with horizontal sidebars. In this embodiment, determination of the unused portions of the unused areas of the video frame is carried out prior to the frame actually reaching the display 206.

At 508, the content receiver 202 performs a comparison of the unused areas of the extracted video frame and the unused areas of the frame currently being displayed. When the unused areas match, the content receiver 202 displays the extracted frame without modification and then returns to 504 and extracts the next video frame.

At 510, when the unused areas do not match, the content receiver adapts the extracted frame to have the same unused areas as the currently displayed frame. That is, wherever sidebars are located on the frame currently being displayed, corresponding pixels of the new frame will also show black sidebars.

Figure 6A:
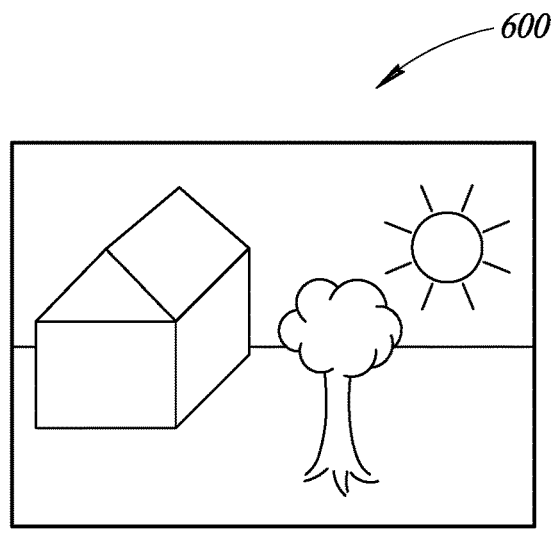
FIG. 6A is a pictorial view of an exemplary unformatted scene.
Figure 6B:
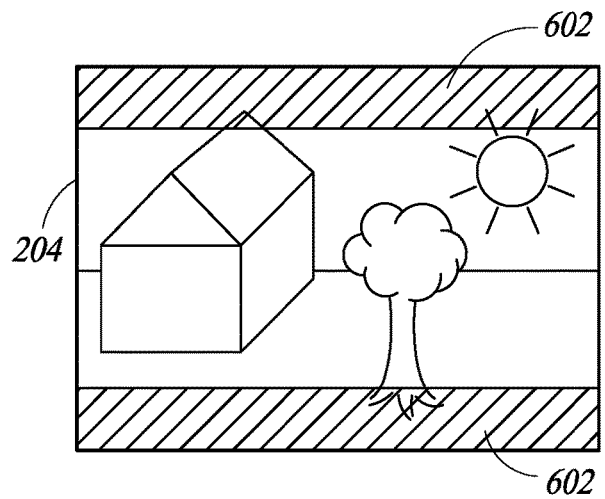
FIGS. 6B-6D are pictorial views of the exemplary scene of FIG. 6A formatted according to several different aspect ratios, as described herein.

Adapting the extracted frame to match the displayed frame can be accomplished in one of several different ways, as illustrated in FIGS. 6A-6D. A scene 600 shown in FIG. 6A represents the extracted frame, which, in this example, has no sidebars. In FIG. 6B, the scene 600 is scaled and projected to fill the entire display 206. Scaling can entail either enlarging or reducing the size of the image. Then, pixels in the sidebar regions are digitally masked by coloring them black. This method has the disadvantage that portions of the picture that coincide with the sidebars will be lost. For example, in the scene 600 showing a house, a tree, and a sun, the tops of the house and the sun, as well as the bottom of the tree, are masked by horizontal sidebars 602.

Figure 6C:
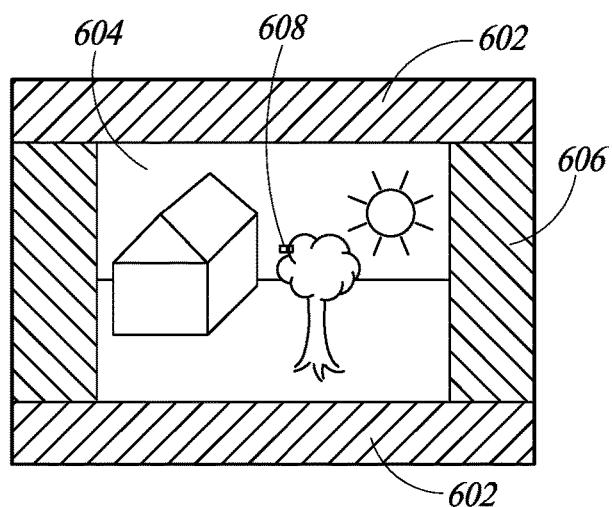
Figure 6D:
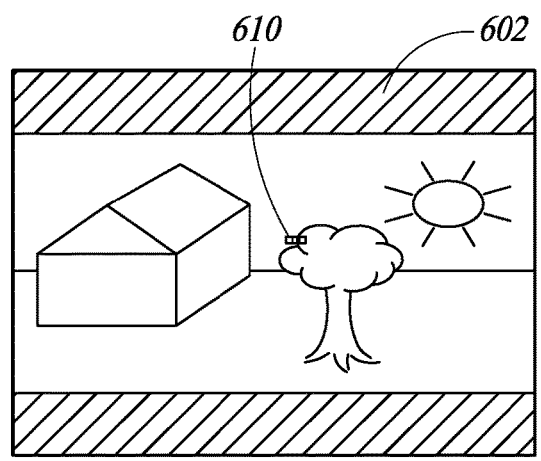

Alternatively, in order not to lose portions of the image, the sidebar regions can be defined first and then the picture can be modified to fit the area between the sidebars. For example, if a low resolution movie is broadcast for high definition display, the image can be stretched by converting the received pixel data to the desired resolution so as to fit between the sidebars. As illustrated in FIG. 6C, the horizontal sidebars 602 can be displayed on the display 206 and then the scene 600 can be proportionally reduced to a smaller scene 604 that fits between the horizontal sidebars 602. However, because the smaller scene 604 does not fill the entire display, there is unused space on the sides as well, which appears as vertical sidebars 606. To eliminate the vertical sidebars, the smaller scene 604 can be stretched in the horizontal direction only, to fill the unused space on the sides so that vertical sidebars are not needed in addition to the horizontal sidebars 602. A two-step process is thus used, which entails first scaling the image and then stretching the image.

Figure 7A:
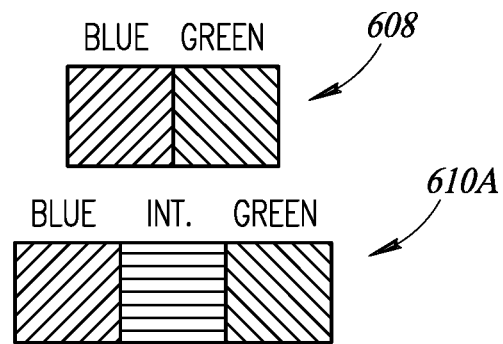
FIG. 7A is a schematic view showing a first method of displaying adjacent pixels from the scene shown in FIG. 6A on a higher resolution display, according to one embodiment described herein.
Figure 7B:
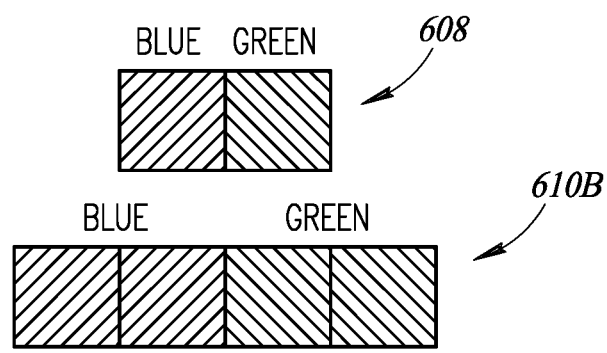
FIG. 7B is a schematic view showing a second method of displaying adjacent pixels from the scene shown in FIG. 6A on a higher resolution display, according to one embodiment described herein.

FIGS. 7A and 7B illustrate various ways to stretch the image by distributing pixel data from the received frame across additional pixels on the display 206. Here, the term pixel expresses the smallest color unit making up the image, wherein each pixel in a video frame has an assigned numerical value representing a distinct color hue. For example, a two-pixel group 608 of the exemplary smaller scene 604 transitions from a blue sky to a green tree as shown in FIG. 7A. Thus, two adjacent pixels of different colors, blue and green, are to be distributed across a larger pixel group 610 (two examples shown, 610A having an odd number of pixels, and 610B, having an even number of pixels). In both cases, data corresponding to each one of the large pixels in the data stream is distributed over multiple smaller pixels across the width of the display 206. To minimize distortion, when a blue pixel is next to a green pixel in the data stream, and the pair of pixels is to be spread out over the three-pixel group 610A on the display, a first pixel is shown as blue, a second pixel adjacent to the blue pixel can be interpolated between the original blue and green hues to be shown as blue-green, and the third adjacent pixel is shown as green. Alternatively, the first two adjacent pixels can be shown as blue and the third one as green, or the first pixel can be shown as blue, and the second and third pixels as green. Using the last two methods, distortion within the image portion of the screen between the sidebars 602 will be greater than when the interpolation method is used.

In a second example shown in FIG. 7B, a four-pixel group 610B is available on the display 206 for the exemplary pair of pixels in the received frame. Thus, the blue pixel can simply be mapped to two blue pixels, and the green pixel can be mapped to two green pixels, which expands the image proportionally in the horizontal direction. Alternatively, the two pixels on the ends of the four-pixel group 610B can be assigned the original blue and green hues, while the middle pixels can be interpolated to have color values between the original blue and green hues. Such methods can be used to distribute the video frame data to fill all of the columns of pixels from left to right when the presence of upper and lower sidebars 602 is desired. Likewise, similar methods can be used to distribute the video frame data to fill all of the rows of pixels from top to bottom when the presence of left and right vertical sidebars 606 is desired.

When there are no sidebars in the currently displayed image, the new frame data is adjusted so that it also has no sidebars. Alternatively, all of the frames can be adjusted to have no sidebars. Thus, if the received video frame has horizontal sidebars, these are removed and the image is distributed over the entire area of the display 206. Or, if the new video frame has vertical sidebars, these are removed and the image is distributed over the entire area of the display 206. In general, the distribution of pixels, as in the example described above, can be carried out by performing a calculation to determine how many high resolution pixels are available to receive the lower resolution data, for example, three display pixels for every pair of received pixels, i.e., 3:2 as in the example above, or twice as many display pixels as received pixels, i.e., 2:1, or 4:3, etc. Then, a choice can be made as to whether to map the pixels or to interpolate between the colors present in the video data.

Returning to FIG. 5, at 512, the adjusted media content is displayed for the viewer 216.

At 514, the next video frame is extracted.

At 516, when a change in the aspect ratio is detected in the media content, the content receiver 202 returns to step 506 to perform a new analysis. Otherwise, the same adaptation is applied at 510 to the next successive video frames.

As can be appreciated, the present disclosure of analyzing video frames and then matching the video frame to the appropriate display can be used in a variety of different environments. In a standard TV viewing situation of the type shown in FIG. 1, the methods as described herein can be used to adjust a video frame to the proper aspect ratio for any particular display, whether the video frame is from an old movie, a VHS format, an HD format, a Beta format, a Super 8 movie format, an IMAX format, or any of the various formats which have been used over many years. Further, it can be used with any display 206 that a user may have in their home which may be an HD style display, an older CRT display, a flat screen LED, or any of the many displays which are on the market today. In addition, the methods as taught herein can be used with many other types of video displays of the many that are on the market today. For example, the methods as taught herein can be used with a display that is a cell phone, a small personal viewing device, a tablet computer, e.g., iPAD, a computer display, or any of the many displays that are available in electronic devices today. The methods are therefore flexible across many different platforms.

In a second embodiment, a query can be made of the display itself, and blank regions which show up on the display, rather than analyzing the type of the display and then analyzing the type of data flow received. Instead, a simple, rather easy test of whether or not the current frame as displayed on the display results in blank pixels is examined, and if blank pixels are present then an adjustment is made to the aspect ratio of the subsequent frames in order to have few, if any, blank spaces on the display.

Figure 8:
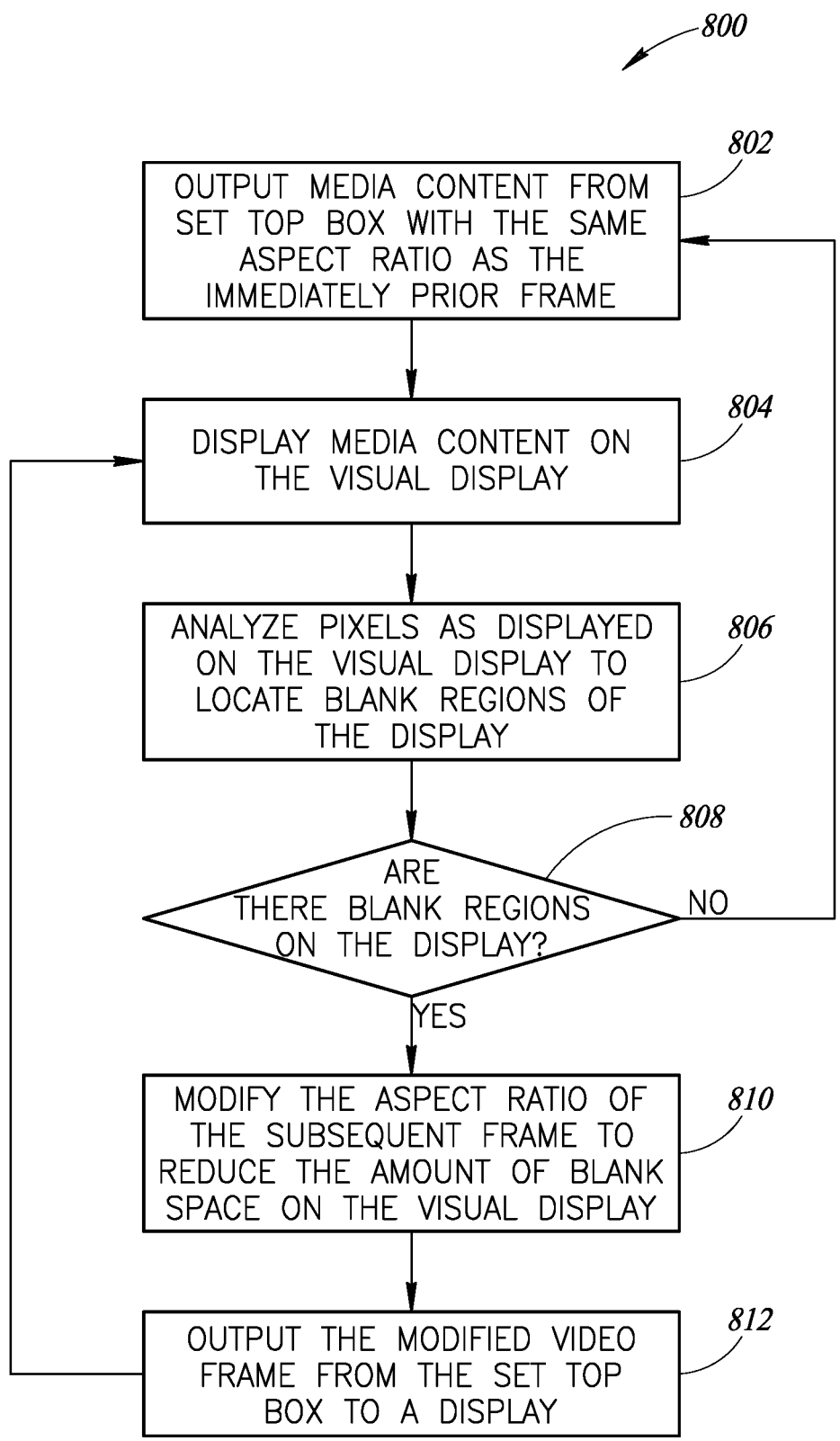
FIG. 8 is a flow diagram showing a sequence of steps in a computer-implemented method of automatic program formatting, according to a second embodiment as described herein.

FIG. 8 is a flow diagram illustrating such an embodiment, in which the aspect ratio of video frames is modified as they are shown on the display. According to a method 800, the video display itself is queried to determine whether or not any pixels on the video display are blank. A blank pixel on a video display is one in which the video frame being shown thereon does not have any data within that pixel. In such a situation, the video display has nothing to show, and therefore that particular pixel is blank. In a normal screen this will usually show up as a black pixel but may, in other instances, show up as being overlaid by other material which is on the screen, or by another view.

At 802, a video frame of the media content 332 is output from the content receiver 202 having the same aspect ratio as the immediately prior frame.

At 804, the video frame is displayed on the video display 206.

At 806, the pixels of the video display are analyzed to locate any blank regions of the display.

At 808, a query is made to determine whether or not there are any blank regions in the display. When there are no blank regions in the display, the video format is considered to be currently acceptable, and the program returns to the initial step 802 to display, from the content receiver 202, media content having the same aspect as the previous frame.

At 810, when the query in step 808 determines that there are blank regions on the display, the aspect ratio of a subsequent frame is modified to have a new aspect ratio which will reduce the amount of blank space on the video display. This can be done by adjusting the area of each pixel, for example, increasing or decreasing the width of each pixel slightly, or increasing or decreasing the height of the pixels, depending on the location of the blank space. Thus the picture may be stretched or compressed slightly in order to have an acceptable aspect ratio to more completely fill the video display 206 according to its proper aspect ratio.

At 812, the modified video frame is then output, and subsequent steps are executed as illustrated in FIG. 8.

An advantage of the method 800 is that the image displayed will have little or no blank regions or sidebars. However, a disadvantage is that if a first program is zoomed to eliminate sidebars, then a subsequent program that lacks sidebars will be zoomed unnecessarily, and the edges of the images from the subsequent program may exceed the boundaries of the display. Using this method, because the actual frame data is not analyzed prior to displaying the frame, a change in the format of the received media content will not be detectable.

As will be appreciated, in some instances, if all blank spaces in the display are completely filled, the aspect ratio of the video content may be so distorted as to be unpleasant or awkward to view. In such a situation, it is permitted to change the aspect ratio of the frame to reduce the number of blank spaces shown, but not remove them altogether. Thus, it is within the concepts as taught herein to reduce the blank spaces as shown on the screen, but it is not required that all blank spaces be completely removed, and it is permissible to have a video display in which the aspect ratio of the video frame is changed so that the blank spaces are less than what they would be with an unmodified frame, but may still result in some edge regions of blank space in the video display.

It will be appreciated that, although specific embodiments of the present disclosure are described herein for purposes of illustration, various modifications may be made without departing from the spirit and scope of the present disclosure. Accordingly, the present disclosure is not limited except as by the appended claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

The invention claimed is:

1. A method, comprising:
receiving, by a server at a remote location with respect to a content receiver, aspect ratio information associated with a video display;
receiving, by the server, video frame data;
analyzing, by a microprocessor at the remote location, the video frame data to determine formatting information for use in displaying an associated video frame on the video display;
transmitting, by the server, the formatting information to the content receiver;
determining no adjustment is needed to additional video frame data for displaying a video frame associated with the additional video frame data on the video display; and
in response to the determining no adjustment is needed to the additional video frame data for displaying the video frame associated with the additional video frame data on the video display, transmitting by the server a signal to the content receiver indicating that an original frame is suitable for display on the video display.

2. The method of claim 1, wherein the analyzing the video frame data includes:
analyze the video frame data to detect unused areas of an extracted video frame;
classifying the video frame data, based on the analysis, as being in a video format characterized by an initial aspect ratio; and
determining whether or not to change the video format of the video frame data to have an adjusted aspect ratio based on the aspect ratio information associated with the video display.

3. The method of claim 2, wherein the transmitting the formatting information to the content receiver includes:
when it is determined to change the video format, including information indicating the adjusted aspect ratio in the formatting information; and
transmitting, by the server, the formatting information, including the information indicating the adjusted aspect ratio, to the content receiver.

4. The method of claim 3 wherein the transmitting, by the server, the formatting information, including the information indicating the adjusted aspect ratio, to the content receiver causes the content receiver to display on the video display the video frame data having the adjusted aspect ratio.

5. A non-transitory computer-readable medium having computer-executable instructions stored thereon that, when executed by at least one computer processor, cause the at least one computer processor to perform:
receiving, by a server at a remote location with respect to a content receiver, aspect ratio information associated with a video display;
receiving, by the server, video frame data;
analyzing, by a microprocessor at the remote location, the video frame data to determine formatting information for use in displaying an associated video frame on the video display;
transmitting, by the server, the formatting information to the content receiver;
determining no adjustment is needed to additional video frame data for displaying a video frame associated with the additional video frame data on the video display; and
in response to the determining no adjustment is needed to the additional video frame data for displaying the video frame associated with the additional video frame data on the video display, transmitting by the server a signal to the content receiver indicating that an original frame is suitable for display on the video display.

6. The non-transitory computer-readable medium of claim 5, wherein the analyzing the video frame data includes:
analyze the video frame data to detect unused areas of an extracted video frame;
classifying the video frame data, based on the analysis, as being in a video format characterized by an initial aspect ratio; and determining whether or not to change the video format of the video frame data to have an adjusted aspect ratio based on the aspect ratio information associated with the video display.

7. The non-transitory computer-readable medium of claim 6, wherein the transmitting the formatting information to the content receiver includes:
when it is determined to change the video format, including information indicating the adjusted aspect ratio in the formatting information; and
transmitting, by the server, the formatting information, including the information indicating the adjusted aspect ratio, to the content receiver.

8. The non-transitory computer-readable medium of claim 7 wherein the transmitting, by the server, the formatting information, including the information indicating the adjusted aspect ratio, to the content receiver causes the content receiver to display on the video display the video frame data having the adjusted aspect ratio.

9. A system comprising:
at least one computer processor;
at least one memory coupled to the at least one processor, the at least one memory having computer-executable instructions stored thereon that, when executed by the least one computer processor, cause the at least one computer processor to perform:
receiving, by a server at a remote location with respect to a content receiver, aspect ratio information associated with a video display;
receiving, by the server, video frame data;
analyzing, by a microprocessor at the remote location, the video frame data to determine formatting information for use in displaying an associated video frame on the video display;
transmitting, by the server, the formatting information to the content receiver;
determining no adjustment is needed to additional video frame data for displaying a video frame associated with the additional video frame data on the video display; and
in response to the determining no adjustment is needed to the additional video frame data for displaying the video frame associated with the additional video frame data on the video display, transmitting by the server a signal to the content receiver indicating that an original frame is suitable for display on the video display.

10. The system of claim 9, wherein the analyzing the video frame data includes:
analyze the video frame data to detect unused areas of an extracted video frame;
classifying the video frame data, based on the analysis, as being in a video format characterized by an initial aspect ratio; and
determining whether or not to change the video format of the video frame data to have an adjusted aspect ratio based on the aspect ratio information associated with the video display.

11. The system of claim 10, wherein the transmitting the formatting information to the content receiver includes:
when it is determined to change the video format, including information indicating the adjusted aspect ratio in the formatting information; and
transmitting, by the server, the formatting information, including the information indicating the adjusted aspect ratio, to the content receiver.

12. The system of claim 11 wherein the transmitting, by the server, the formatting information, including the information indicating the adjusted aspect ratio, to the content receiver causes the content receiver to display on the video display the video frame data having the adjusted aspect ratio.

* * * * *